United States Patent
Zhang et al.

(10) Patent No.: US 12,051,273 B2
(45) Date of Patent: Jul. 30, 2024

(54) METHOD FOR RECOGNIZING ACTIONS, DEVICE AND STORAGE MEDIUM

(71) Applicant: BIGO TECHNOLOGY PTE. LTD., Singapore (SG)

(72) Inventors: Shuye Zhang, Guangzhou (CN); Jundong Wang, Guangzhou (CN); Zhujin Liang, Guangzhou (CN); Depeng Liang, Guangzhou (CN); Zhuanghui Zhang, Guangzhou (CN); Tiancai Ye, Guangzhou (CN); Wei Zhou, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 445 days.

(21) Appl. No.: 17/426,509

(22) PCT Filed: Jan. 17, 2020

(86) PCT No.: PCT/CN2020/072781
§ 371 (c)(1),
(2) Date: Jul. 28, 2021

(87) PCT Pub. No.: WO2020/156245
PCT Pub. Date: Aug. 6, 2020

(65) Prior Publication Data
US 2022/0101654 A1    Mar. 31, 2022

(30) Foreign Application Priority Data

Jan. 29, 2019 (CN) .......................... 201910088190.X (51) Int. Cl.
*G06V 40/20* (2022.01)
*G06N 3/08* (2023.01)
(Continued)

(52) U.S. Cl.
CPC ............... *G06V 40/20* (2022.01); *G06N 3/08* (2013.01); *G06V 10/82* (2022.01); *G06V 20/41* (2022.01)

(58) Field of Classification Search
CPC ........ G06V 40/20; G06V 40/28; G06V 40/23; G06V 10/82; G06V 20/41; G06N 3/08
See application file for complete search history.

(56) References Cited

U.S. PATENT DOCUMENTS

| | | |
|---|---|---|
| 2011/0112997 A1 | 5/2011 | Sabe |
| 2013/0154913 A1 | 6/2013 | Genc et al. |
| 2020/0394393 A1* | 12/2020 | Kraft .................... G06V 40/113 |

FOREIGN PATENT DOCUMENTS

| | | |
|---|---|---|
| CN | 102567703 A | 7/2012 |
| CN | 104766038 A | 7/2015 |

(Continued)

OTHER PUBLICATIONS

European Patent Office, Extended European Search Report pursuant to Rule 62 EPC, dated Jan. 20, 2022 in Patent Application No. 20749054.1, which is a foreign counterpart to this U.S. Application.

(Continued)

*Primary Examiner* — Daniel G Mariam
(74) *Attorney, Agent, or Firm* — Kolitch Romano Dascenzo Gates LLC (57) ABSTRACT

A method for recognizing actions in a video is provided. The method comprises, determining, based on key points of skeleton of at least one video frame in a video to be recognized, shallow features of the at least one video frame; acquiring image features of the at least one video frame; acquiring action features of the at least one video frame based on the shallow features and the image features; acquiring an action recognition result of the at least one video frame by inputting the action features of the at least one video frame into an action recognition model, wherein (Continued)

the action recognition result includes states and state probabilities of actions in the at least one video frame; and determining an execution state of a target action in the at least one video frame based on the action recognition result of the at least one video frame.

20 Claims, 3 Drawing Sheets

(51) Int. Cl.
 *G06V 10/82* (2022.01)
 *G06V 20/40* (2022.01)

(56) References Cited

FOREIGN PATENT DOCUMENTS

| | | |
|---|---|---|
| CN | 105335725 A | 2/2016 |
| CN | 106066996 A | 11/2016 |
| CN | 107341435 A | 11/2017 |
| CN | 107679522 A | 2/2018 |
| CN | 107766839 A | 3/2018 |
| CN | 108564047 A | 9/2018 |
| CN | 108875586 A | 11/2018 |
| CN | 108985259 A | 12/2018 |
| IN | 106648103 A | 5/2017 |
| IN | 108446601 A | 8/2018 |

OTHER PUBLICATIONS

Wu, Di, et al.; "Deep Dynamic Neural Networks for Multimodal Gesture Segmentation and Recognition"; IEEE Transactions on Pattern Analysis and Machine Intelligence, IEEE Computer Society, USA, vol. 38, No. 8, Aug. 2016, pp. 1583-1597, XP011615571, ISSN: 0162-8828, p. 1583-p. 1595.
Sakhalkar, Kaustubh, et al.; "Learning to Represent Spatio-Temporal Features for Fine Grained Action Recognition"; 2018 IEEE International Conference on Image Processing, Applications and Systems (IPAS), IEEE, Dec. 12, 2018, pp. 268-272, XP033547043, section IV. C, figure 1.
Liu, Jiaying, et al.; "Multi-Modality Multi-Task Recurrent Neural Network for Online Action Detection"; IEEE Transactions on Circuits and Systems for Video Technology, IEEE, USA, vol. 29, No. 9, Jan. 30, 2018, pp. 2667-2682, XP011744311, figure 1.
Jalal, Ahmad, et al.; "Robust Human Activity Recognition from Depth Video Using Spatiotemporal Multi-fused Features"; Pattern Recognition, Elsevier, GB, vol. 61, Aug. 4, 2016, pp. 295-308, figure 8, section 2.3.1.
International Search Report of the International Searching Authority for State Intellectual Property Office of the People's Republic of China in PCT application No. PCT/CN2020/072781 issued on Apr. 23, 2020, which is an international application corresponding to this U.S. application.
The State Intellectual Property Office of People's Republic of China, First Office Action in Patent Application No. CN201910088190.X issued on Nov. 18, 2020, which is a foreign counterpart application corresponding to this U.S. Patent Application, to which this application claims priority.
The State Intellectual Property Office of People's Republic of China, Second Office Action in Patent Application No. CN201910088190.X issued on Feb. 18, 2021, which is a foreign counterpart application corresponding to this U.S. Patent Application, to which this application claims priority.
Notification to Grant Patent Right for Invention of Chinese Application No. 201910088190.X Issued on May 14, 2021.
Han, Yun et al.; "Real-time Skeleton Based Indoor Activity Recognition", Proceedings of the 32nd Chinese Control Conference (vol. C); Dec. 31, 2013, pp. 1-6.
Liu, Shuanpeng; "Human Action Recognition Based on Image Feature and Skeleton Feature of Kinect", Chinese Master's Theses Full-text Database, Information Technology; Mar. 15, 2017, pp. I, 18-24, 33-36.
Ni, Bingbing et al.; "Integrating Multi-stage Depth-induced Contextual Information for Human Action Recognition and Localization", 2013 10th IEEE International Conference and Workshops on Automatic Face and Gesture Recognition; Dec. 31, 2013, pp. 1-8.
Wu, Huang; "Research on Skeleton Based Human Action Recognition Method", Chinese Master's Theses Full-text Database, Social Sciences II, Jan. 15, 2019, abstract, and pp. 37-40, 43, 44 and 53.

\* cited by examiner

METHOD FOR RECOGNIZING ACTIONS, DEVICE AND STORAGE MEDIUM

CROSS-REFERENCE TO RELATED APPLICATION

This application is a US national stage of international application NO. PCT/CN2020/072781, filed on Jan. 17, 2020, which claims priority to Chinese Patent Application No. 201910088190.X, filed on Jan. 29, 2019 and entitled "ACTION RECOGNITION METHOD, APPARATUS AND DEVICE AND STORAGE MEDIUM". Both applications are herein incorporated by reference in their entireties.

TECHNICAL FIELD

Embodiments of the present disclosure relate to a computer vision technology, particularly, relate to a method for recognizing actions, a device and a storage medium.

BACKGROUND

Action recognition has been widely applied in the field of entertainments and interactions on mobile terminals, such as the production of real-time short videos, real-time interaction during live-streaming, and motion-sensing games. Action recognition is one of the most challenging research directions in the field of computer vision.

SUMMARY

Embodiments of the present disclosure provide a method and apparatus for recognizing actions, a device and a storage medium to increase the accuracy in action recognition.

An embodiment of the present disclosure provides a method for recognizing actions. The method includes:

determining, based on key points of skeleton of at least one video frame in a video to be recognized, shallow features of the at least one video frame;

acquiring image features of the at least one video frame;

acquiring action features of the at least one video frame based on the shallow features and the image features;

acquiring an action recognition result of the at least one video frame by inputting the action features of the at least one video frame into an action recognition model, wherein the action recognition result includes states and state probabilities of actions in the at least one video frame; and determining an execution state of a target action in the at least one video frame based on the action recognition result of the at least one video frame.

An embodiment of the present disclosure further provides an apparatus for recognizing actions. The apparatus includes:

a shallow feature determining module configured to determine, based on key points of skeleton of at least one video frame in a video to be recognized, shallow features of the at least one video frame;

an image feature acquiring module configured to acquire image features in the at least one video frame;

an action feature acquiring module configured to acquire action features of the at least one video frame based on the shallow features and the image features;

an action recognition result acquiring module configured to acquire an action recognition result of the at least one video frame by inputting the action features of the at least one video frame into an action recognition model, wherein the action recognition result includes states and state probabilities of actions in the at least one video frame; and an execution state determining module configured to determine an execution state of a target action in the at least one video frame based on the action recognition result of the at least one video frame.

An embodiment of the present disclosure further provides a device. The device includes:

one or more processors;

a memory configured to store one or more programs;

wherein the one or more programs, when executed by the one or more processors, cause the one or more processors to perform the method as defined in the embodiments of the present disclosure.

An embodiment of the present disclosure further provides a computer-readable storage medium storing therein at least one computer program, wherein the at least one program, when run by a processor, causes the processor to perform the method as defined in the embodiments of the present disclosure.

DETAILED DESCRIPTION

The present disclosure is explained below with reference to the accompanying drawings and the embodiments. The specific embodiments described here are merely for explaining the present disclosure, but not intended to limit the present disclosure. For the convenience of description, the drawings only illustrate a part rather than all of the structure related to the present disclosure.

Action recognition, when applied to human-computer interactions and entertainment games on mobile terminals, has higher requirements for the recognition accuracy, instantaneity, and flexibility of an action recognition algorithm. For the recognition accuracy, the action recognition algorithm needs to acquire an accurate recognition result even in a complex and changeable environment, such that an accurate feedback result can be generated based on the accurate recognition result, thereby improving user experience. For the instantaneity, the action recognition algorithm needs to be operable in different application systems, such as an Android system or an IOS system, in real time. For flexibility, the action recognition algorithm needs to provide both the action type of each of the video frames, and the position and speed information of the key points of skeleton in the video frame, so as to meet the application requirements of an upper layer.

In the related art, the action recognition is usually conducted by the following two methods: in a first method, Red-Green-Blue (RGB) images and optical flow information of a video are input into a convolutional neural network to acquire action types contained in the video; and in a second method, key points of skeleton of a plurality of video frames are acquired by an algorithm for recognizing the key points of skeleton, and then input into the convolutional neural network to acquire action types contained in the video and the position and speed information of the key points of skeleton.

In the related art, at least the following problems exist: for the first method, since only the action types contained in the video can be acquired and the position and speed information of the key points of skeleton cannot be acquired, the flexibility and scalability are restricted; and for the second method, since the algorithm for recognizing the key points of skeleton is more sensitive to lighting, environment and movement speed, the cases such as losses of key points of skeleton and deviations of the key points of skeleton from real positions often occur, leading to low accuracy in action recognition.

The action recognition algorithms in the traditional technologies cannot meet the above requirements. In order to make the action recognition algorithm meet the above requirements, it can be considered to improve the action recognition algorithm applied in computer vision technology. The above content is described below in conjunction with specific embodiments.

Figure 1:
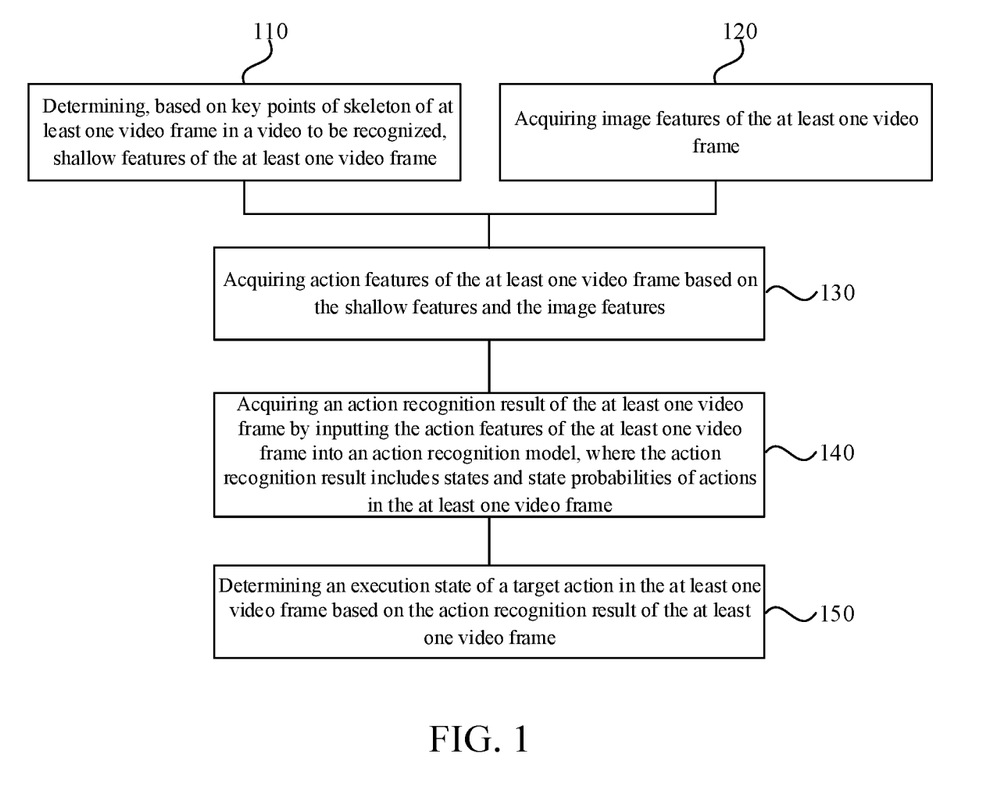
FIG. 1 is a flowchart of a method for recognizing actions according to an embodiment of the present disclosure.

FIG. 1 is a flowchart of a method for recognizing actions according to an embodiment of the present disclosure. This embodiment is applicable to the case of recognizing the actions in a video. The method may be executed by an apparatus for recognizing actions. The apparatus may be implemented in a form of software and/or hardware, and may be configured in a device, for example, a computer or a mobile terminal, etc. As shown in FIG. 1, the method includes the following steps.

In step 110, shallow features of at least one video frame are determined based on key points of skeleton of the at least one video frame in a video to be recognized.

In the embodiments of the present disclosure, the video refers to a series of static pictures captured, recorded, processed, stored, transmitted and reproduced by means of electrical signals When the continuous static pictures change more than 24 frames per second, human eyes cannot distinguish the single static picture according to the principle of persistence of vision, and the continuous static pictures look like a smooth and continuous visual effects, such the continuous static pictures are called video. Based on the above, the video may be understood as an image sequence consisting of at least one video frame. The video to be recognized refers to a video containing actions that need to be recognized. In order to recognize the actions in the video to be recognized, the video may be divided into at least one video frame, each of which is analyzed respectively. The video may be a video that is shot through a camera of a mobile terminal and uploaded in real time when a user is using a short-video application or a live-streaming application, etc., or may be a video saved locally on the mobile terminal. A source of the video may be defined according to an actual situation, and is not limited herein.

Regarding the action recognition, a human body may be regarded as consisting of different components connected by key points of skeleton, and the action recognition may be determined by acquiring position information of a plurality of key points of skeleton, where the position information of the key points of skeleton may be represented by two-dimensional plane coordinates. For the action recognition, 14 key points of skeleton such as the top of the head, chin, left shoulder, right shoulder, left elbow, right elbow, left wrist, right wrist, left crotch, right crotch, left knee, right knee, left ankle and right ankle need to be acquired. The key points of skeleton include a wealth of human posture information and movement information, which may provide a reliable basis for the subsequent recognition of human actions.

The key points of skeleton may be recognized from the video frame by using a key human-skeleton point algorithm based on a convolutional neural network, where a core problem to be solved by the convolutional neural network is how to automatically extract and abstract features, and then map the features to a task target to solve actual problems. A convolutional neural network generally consists of the following three parts: a first part is an input layer; a second part is composed of a convolutional layer, an excitation layer and a pooling layer (or a down-sampling layer); and a third part is composed of a fully connected multi-layer perceptron classifier. The convolutional neural network has a characteristic of weight sharing, which refers to that the same feature at different positions in an entire image may be extracted through a convolution operation of one convolution kernel. That is to say, identical targets at different positions in a piece of image are substantially the same in local features. Only one feature may be acquired by using one convolution kernel; and by setting up multi-core convolution, the features of the image may be extracted by learning different features with each of the convolution kernels. Since the technical solutions of the embodiments of the present disclosure are mainly applied to mobile terminals, simplification may be performed as follows based on the convolutional neural network described above: at an algorithm level, methods such as channel pruning, inter-layer fusion, and network distillation may be used; and at an instruction level, methods such as fixed-point quantization and assembly optimization may be used. By means of the simplification operation described above, a lightweight convolutional neural network is formed. In order to ensure the accuracy of the action recognition, the key points of skeleton will be recognized for each of the at least one video frame.

For each of the at least one video frame, after the key points of skeleton of the video frame are acquired, the shallow features of the video frame may be determined based on the key points of skeleton. The shallow features may include static features, limb features, symmetric features, and dynamic features. Since the shallow features are acquired based on the key points of skeleton, the shallow features may reflect posture and movement information of a human body.

In step 120, image features of the at least one video frame are acquired.

In the embodiment of the present disclosure, in order to improve the accuracy of the action recognition, it may be considered to extract the image features of each of the at least one video frame. With respect to that the image features may improve the accuracy of the action recognition, it can be understood as follows: under complex background or complex lighting conditions, the key points of skeleton acquired based on the key human-skeleton point algorithm are prone to distortions or serious deviations from an actual situation, leading to inaccuracy of the shallow features acquired based on the key points of skeleton; if the action recognition is conducted only based on the shallow features, the accuracy of the action recognition of the human body can be affected; however, these are not true for the image features, that is, the image features are insensitive to factors such as background and lighting, and the image features, acquired under the complex background and lighting conditions, of each of the at least one video frame are still accurate. In addition, the image features may also provide certain semantic information, which may improve the accuracy of the action recognition.

The image features of each of the at least one video frame may be acquired by the following two methods: in a first method, the image features of each of the at least one video frame are acquired by inputting the video frame into a pre-trained image feature recognition model, where the image feature recognition model may be generated by training based on a neural network; and in a second method, a plurality of video frames are divided into at least two video frame sequences, the image features of a first video frame in each of the at least two video frame sequences are acquired by inputting the first video frame in each of the at least two video frame sequences into an image feature recognition model, and the image features of the first video frame in each of the at least two video frame sequences are taken as image features of each of the video frames in each of the at least two video frame sequences, where the image feature recognition model is generated by training based on a neural network.

In step 130, action features of the at least one video frame are acquired based on the shallow features and the image features.

In the embodiments of the present disclosure, the action features of each of the at least one video frame may be acquired based on the shallow features and image features of each of the at least one video frame. In other words, the action features of each of the at least one video frame are fused with the shallow features and image features of each of the at least one video frame, and the action features have the advantages of the shallow features and image features. That is, the shallow features provide accurate human posture and movement information, and the image features are more robust than the shallow features. Meanwhile, the image features may also provide certain semantic information. Taking the action features as input variables of the action recognition model is conducive to the improvement of the accuracy of the action recognition.

In step 140, an action recognition result of the at least one video frame is acquired by inputting the action features of the at least one video frame into an action recognition model, where the action recognition result includes states and state probabilities of actions in the at least one video frame.

In the embodiment of the present disclosure, in order to accurately determine which action and which state of the action is being executed in each of the at least one video frame, actions may be split by state. That is, each of the actions is split into at least one state. In an exemplary embodiment, for example, a running action is split into five states, including: toe lift, hand-foot swing, ground contact, body weight support, and toe lift. The action may be split according to the actual situation of each action. Correspondingly, the states included in different actions are different in most cases, but may also be the same in some cases. In addition, a number of states included in different actions may be the same or different. The states acquired by splitting each of the actions may also be classified. That is, each of the actions is split into a start state, an intermediate state, and an end state. For the running action as mentioned above, the toe lift may be classified as the start state; the hand-foot swing, the ground contact and the body weight support may be classified as the intermediate state; and the toe lift may be classified as the end state. A reason for the above classification lies in that: in actual practices, an upper-layer application needs to execute different operations in the intermediate state and the end state of an action, but the intermediate state is not distinguished. For the running action described above, the upper-layer application only needs to execute different operations in the intermediate state and the end state of the action. Identical operations are executed for the intermediate states without distinction. That is, identical operations are executed for the states of hand-foot swing, ground contact, and body weight support.

The action recognition model according to the embodiment of the present disclosure may be configured to recognize N actions, and denote an $n^{th}$ action as $A_n$, $n \in \{0,1, 2, \ldots, N-1\}$. Meanwhile, $A_n$ may be split into a plurality of states as well, i.e., $A_n = \{S_{n,0}, S_{n,1}, \ldots, S_{n,m}, \ldots, S_{n,M}\}$, where $S_{n,m}$ represents an $m^{th}$ state of the $n^{th}$ action; $m \in \{0,1, \ldots, M\}$, then a number of states that may be recognized by the action recognition model is $\Sigma_{n=0}^{N-1} |A_n|$; and $|A_n|$ represents a number of states included in the $n^{th}$ action. After the action recognition model is determined, the states of the actions that may be recognized thereby are determined accordingly. The states of the actions mentioned here refer to the states of all the actions. The action recognition result acquired by the action recognition model includes the states and state probabilities of the actions. The state of each of the actions corresponds to the state probability of the action. That is, the state of each of the actions corresponds to one state probability. In addition, since the states of the actions that may be recognized by the action recognition model are determined accordingly after the action recognition model is determined, the states of the action are the same but the state probabilities of the action are different among the action recognition results obtained from inputting different input variables into the action recognition model.

For the technical solutions of the embodiments of the present disclosure, the action features of each of the at least one video frame are input as input variables into the action recognition model to acquire the action recognition result of the video frame. The action recognition result includes the states and state probabilities of the actions in the at least one video frame. The states of the actions in the action recognition results of different video frames are the same, which is determined by the same action recognition model selected; but the state probabilities are different.

The action recognition model may be generated by training of training samples based on a pre-trained classifier model, where the training samples may include training video frames and real action states of each of the training video frames. Commonly used classifier models may include a random forest, a fully connected neural network, a fully convolutional neural network, a recurrent neural network, etc. The random forest is a classifier containing a plurality of decision trees, and has an output category determined by a mode of categories output by individual trees. The fully convolutional neural network refers to a convolutional neural network that does not contain a fully connected layer. Since a video contains time sequence information, the time sequence information may be learned by combining the recurrent neural network and the fully convolutional neural network. The processing of the recurrent neural network described here involves the recurrent neural network per se, as well as variant forms of the recurrent neural network. The variant forms of the recurrent neural network may include long and short time sequence networks.

In step 150, an execution state of a target action in the at least one video frame is determined based on the action recognition result of the at least one video frame.

In the embodiment of the present disclosure, the execution state of the target action of each of the at least one video frame indicates which action and which state the action is being executed by a target object in the video frame. The action being executed is called the target action. In an exemplary embodiment, in a video frame V, a target object B is executing the toe lift of the running action, where the running action being executed is the target action.

Determining the execution state of the target action in the at least one video frame based on the action recognition result of the at least one video frame can be interpreted in the following two ways: in a first way, the execution state of the target action in each of the at least one video frame is determined based on the action recognition result of the video frame and action recognition results of T video frames previous to the video frame; and in a second way, the execution state of the target action in each of the at least one video frame is determined based on the action recognition result of the video frame. A difference between the two lies in that: regarding one video frame, the former determines the execution state of the target action in the video frame not only based on the action recognition result of the video frame but also based on action recognition results of T video frames previous to the video frame. The latter determines the execution state of the target action in the video frame only based on the action recognition result of the video frame. That is, when determining the execution state of the target action in the video frame, the former makes a joint decision by combining the action recognition results of the T video frames previous to the video frame, and the latter makes a decision only based on the action recognition result of the video frame. Since the former determines the execution state of the target action in each of the at least one video frame by combining the action recognition results of the T video frames previous to the video frame, the accuracy of the execution state of the target action in the video frame as determined by the former is higher than the latter. The reasons are as follows:

In a first aspect, the action recognition model may make mis-recognition. In other words, it may be impossible to guarantee that the action recognition result of each of the at least one video frame is correct. Based on this, it may be also impossible to guarantee the correctness of the execution state of the target action determined based on the action recognition result of the video frame.

In a second aspect, there is a certain correlation among a plurality of video frames in the video. This correlation is reflected as follows in the action recognition: the execution states of the target actions between a plurality of adjacent video frames are correlated, because the actions include a plurality of states having a time-sequence correlation relationship, and the above-mentioned states having the time-sequence correlation relationship will appear in the plurality of adjacent video frames. Based on the above description, for each of the video frames, the correctness of the execution state of the target action determined based on the action recognition result of the video frame may be verified based on the action recognition results of T video frames previous to the video frame. That is, for each of the video frames, the execution state of the target action is determined based on the action recognition result of the video frame, and the correctness of the execution state of the target action in the video frame may be verified by the action recognition results of T video frames previous to the video frame. In an exemplary embodiment, if it is determined based on an action recognition result of a current video frame that an execution state of a target action in the current video frame is an end state of an action α being executed by the target object B, start and intermediate states of the action α theoretically exist in the T video frames previous to the current video frame, since there is a time-sequence correlation relationship among the stages of the actions. If the start and intermediate states of the action α exist in the T video frames previous to the current video frame, it can be determined that the execution state of the target action determined based on the action recognition result of the current video frame is correct. If the start state and/or the intermediate state of the action α do/does not exist in the T video frames previous to the current video frame, it can be determined that the execution state of the target action determined based on the action recognition result of the current video frame is incorrect.

For each of the video frames, according to the first aspect, it is less accurate to determine the execution state of the target action in the video frame only based on the action recognition result of the video frame. According to the second aspect, the correctness of the execution state of the target action determined based on the action recognition result of the video frame may be verified based on the action recognition results of T video frames previous to the video frame. Only if the execution state is verified to be correct, it is possible to determine that the execution state of the target action determined based on the action recognition result of the video frame is indeed the execution state of the target action in the video frame. Based on the above two aspects, it can explain that the accuracy of the execution state of the target action in the video frame as determined based on the action recognition result of the video frame and action recognition results of T video frames previous to the video frame is higher.

If a video frame is a first video frame of the video and the T video frames previous to the first video frame do not exist, the execution state of the target action in the video frame may be determined only based on the action recognition result of the video frame.

The execution state of the target action in the video frame as determined will be sent to an upper-layer application in real time, such that the upper-layer application may set different operations, such as adding different video effects, based on the execution state of the target action.

Optionally, based on the technical solutions described above, determining the execution state of the target action in the at least one video frame based on the action recognition result of the at least one video frame may include: based on the state probabilities of a plurality of actions in the action recognition result of the each of the at least one video frame, the states of the plurality of actions corresponding to the state probabilities of the plurality of actions are ranked; and target states of the actions in the video frame are determined based on a ranking result. The execution state of the target action in each of the at least one video frame is determined based on the target states of the actions in the video frame.

In the embodiment of the present disclosure, the action recognition result of the video frame includes the states and state probabilities of the actions. It can be known from the foregoing that the actions in the action recognition results of different video frames are the same in the state, and different in the state probability.

For each of the at least one video frame, the states of the actions may be ranked in a descending order based on the state probabilities of the actions in the action recognition result of the video frame; and states of U previous actions are selected as the target states of the actions. The determined target states of the actions may be the states of the same action or the states of different actions. In an exemplary embodiment, if U=3 is set, target states of actions in a video frame are $\{S_{n,3}, S_{n-2,1}, S_{n,1}\}$. It can be seen that the target states of the actions are not all the states of the same action, where $S_{n,1}$ and $S_{n,3}$ are the states of the same action, and $S_{n-2,1}$ is the state of another action. Or, the target states of the actions of a video frame are $\{S_{n,3}, S_{n,0}, S_{n,1}\}$. It can be seen that the target states of the actions are the states of the same action. If the state probabilities of the actions are the same, an action corresponding to a state probability of one of the actions may be randomly selected.

Based on the determination of the target states of the actions in each of the at least one video frame, determining the execution state of the target action in each of the at least one video frame based on the target states of the actions in each of the at least one video frame may be interpreted in the following two ways: in a first way, for each of the at least one video frame, the execution state of the target action in the video frame is determined based on the target states of the actions in the video frame and the target states of the actions in T video frames previous to the video frame; and in a second way, for each of the at least one video frame, the execution state of the target action in the video frame is determined based on the target states of the actions in the video frame. A difference between the two lies in that: regarding one video frame, the former determines the execution state of the target action in the video frame not only based on the target states of the actions in the video frame but also based on the target states of the actions in T video frames previous to the video frame. The latter determines the execution state of the target action in the video frame only based on the target states of the actions in the video frame. That is, when determining the execution state of the target action in the video frame, the former makes a joint decision by combining the target states of the actions in the T video frames previous to the video frame, and the latter makes a decision only based on the target states of the actions in the video frame. Similarity, since the former determines the execution state of the target action in each of the at least one video frame by combining the target states of the actions in the T video frames previous to the video frame, the accuracy of the execution state of the target action of the video frame as determined by the former is higher than the latter.

Optionally, based on the technical solutions above, determining the execution state of the target action in each of the at least one video frame based on the target states of the actions in each of the at least one video frame may include: determining the execution state of the target action in each of the at least one video frame based on the target states of the actions in the video frame and target states of actions in T video frames previous to the video frame.

In the embodiment of the present disclosure, in order to improve the accuracy of the execution state of the target action in each of the at least one video frame as determined, it can be considered to determine the execution state of the target action in each of the at least one video frame by combining the target states of the actions in T video frames previous to the video frame. That is, the accuracy of the execution state of the target action in each of the at least one video frame as determined may be verified based on the target states of the actions in T video frames previous to the video frame. Reasons for adopting the above-mentioned way, a reference may be found in the foregoing part stated from two aspects, which will not be repeated here. The target states of the actions in each of the at least one video frame are determined based on the action recognition result of the video frame. Based on this, although described above is, based on the action recognition results of T video frames previous to the video frame, to verify the correctness of the execution state of the target action determined based on the action recognition result of the video frame, the reasons for adopting the above-mentioned way are the same as the foregoing reasons, since the target states of the actions in the video frame are determined based on the action recognition result of the video frame.

For each of the at least one video frame, determining the execution state of the target action in the video frame based on the target states of the actions in the video frame and the target states of the actions in T video frames previous to the video frame includes: for each of the at least one video frame, in the case that the target states of the actions in the video frame are the start states of the target action, it is determined that the target action in the video frame is being executed. In the case that the target states of the actions in the video frame are intermediate states of the target action and the target states of the actions in the T video frames previous to the video frame includes the start states of the target action, it is determined that the target action in the video frame is being executed. In the case that the target states of the actions in the video frame are end states of the target action and the target states of the actions in the T video frames previous to the video frame includes the start and the intermediate states of the target action, it is determined that the target action in the video frame is ended.

The start and intermediate states of the target action exist in the target states of the actions in the T video frames previous to the video frame, the start and intermediate states of the target action here exist in different video frames; and a video frame corresponding to the start state of the target action is previous to the video frame corresponding to the intermediate state of the target action. That is, the states of the target action in different video frame should conform to the time sequence relationship.

Optionally, based on the above technical solutions, determining the execution state of the target action in each of the at least one video frame based on the target states of the actions in the video frame and the target states of the actions in T video frames previous to the video frame may include: determining that the target action in each of the at least one video frame is being executed in the case that the target states of the actions in the video frame are start states of the target action; determining that the target action in each of the at least one video frame is being executed in the case that the target states of the actions in the video frame are intermediate states of the target action and the target states of actions in the T video frames previous to the video frame include the start states of the target action; and determining that the target action in each of the at least one video frame is ended in the case that the target states of the actions in the video frame are end states of the target action and the target states of the actions in the T video frames previous to the video frame include the start states and the intermediate states of the target action.

In the embodiment of the present disclosure, for each of the at least one video frame, if the target states of the actions in the video frame are the start states of the target action, it can be determined that the target action in the video frame is being executed.

If the target states of the actions in the video frame are the intermediate states of the target action, it is necessary to determine whether the start state of the target action exists in the target states of the actions in the T video frames previous to the video frame. This is because, if the target states of the actions in the video frame are the intermediate states of the target action, the start state of the target action should exist theoretically in the target states of the actions in the T video frames previous to the video frame. Only in this way, a complete action path may be formed. Based on the description above, if the start state of the target action exists in the target states of the actions in the T video frames previous to the video frame, it can be determined that the target action in the video frame is being executed.

If the target states of the actions in the video frame are end states of the target action, it is necessary to determine whether the start and intermediate states of the target action exist in the target states of the actions in the T video frames previous to the video frame. This is because, if the target states of the actions in the video frame are the end states of the target action, the start and intermediate states of the target action should exist theoretically in the target states of the actions in the T video frames previous to the video frame. Only in this way, a complete action path may be formed. If the start and intermediate states of the target action exists in the target states of the actions in the T video frames previous to the video frame, it can be determined that the target action in the video frame is ended.

Based on the description above, for each of the at least one video frame, the states of the actions are ranked in a descending order based on the state probabilities of the actions in the action recognition result of the video frame; and states of U previous actions are selected as the target states of the actions. Then, the execution state of the target action in the video frame is determined based on the target states of the actions in the video frame. Here, the execution state of the target action in the video frame will be determined based on target state of an action ranked the first among the target states of U actions; and target states of another U−1 actions will participate in the determination of an execution state of a target action in a video frame posterior to the video frame.

In an exemplary embodiment, if an action $A_n = \{S_{n,0}, S_{n,1}, S_{n,2}\}$ is set, the action $A_n$ then includes three states, namely $S_{n,0}$, $S_{n,1}$, and $S_{n,2}$, where $S_{n,0}$ indicates a start state of the action $A_n$; $S_{n,1}$ indicates an intermediate state of the action $A_n$; and $S_{n,2}$ indicates an end state of the action $A_n$. For an action $A_{n-2} = \{S_{n-2,0}, S_{n-2,1}, S_{n-2,2}\}$, $A_{n-2}$ includes three states, namely, $S_{n-2,0}$, $S_{n-2,1}$, and $S_{n-2,2}$, where $S_{n-2,0}$ indicates a start state of the action $A_{n-2}$; $S_{n-2,1}$ indicates an intermediate state of the action $A_{n-2}$; and $S_{n-2,2}$ indicates an end state of the action $A_{n-2}$.

Regarding a $t^{th}$ video frame, target states of actions therein are $\{S_{n,2}, S_{n,1}, S_{n-2,2}\}$, where $S_{n,2}$ indicates a target state of an action ranked the first. In the case that the target states of the actions in the video frame are determined to be the end states of a target action $A_n$ based on $S_{n,2}$, it is necessary to determine whether a start state $S_{n,0}$ and an intermediate state $S_{n,1}$ of the target action $A_n$ exists in the target states of the actions in T video frames previous to the video frame. As shown in Table 1, the target states of the actions in the video frame (i.e., the $t^{th}$ video frame) and T video frames previous to the video frame are provided.

TABLE 1

| Video frame | t − T | ... | t − ε | ... | t − 3 | t − 2 | t − 1 | t |
|---|---|---|---|---|---|---|---|---|
| Target action state 1 | $S_{n,0}$ | ... | $S_{n,0}$ | ... | $S_{n,0}$ | $S_{n,1}$ | $S_{n,1}$ | $S_{n,2}$ |
| Target action state 2 | $S_{n,1}$ | ... | $S_{n,1}$ | ... | $S_{n,1}$ | $S_{n,2}$ | $S_{n,2}$ | $S_{n,1}$ |
| Target action state 3 | $S_{n-1,1}$ | ... | $S_{n-1,1}$ | ... | $S_{n-1,1}$ | $S_{n-2,0}$ | $S_{n-2,0}$ | $S_{n-2,2}$ |

Based on Table 1, it can be seen that the start state $S_{n,0}$ and the intermediate state $S_{n,1}$ of the target action $A_n$ in the video frame exist in the T video frames previous to the video frame; and a video frame corresponding to the start state $S_{n,0}$ of the target action $A_n$ is previous to a video frame corresponding to the intermediate state $S_{n,1}$ of the target action $A_n$. Based on the description above, it can be determined that the target action in the video frame is ended.

A value of T may be set according to the hardware performance of a mobile terminal and the requirements of actual practices, which is not limited here.

Step 110 and step 120 may be executed synchronously or successively, or step 120 may be executed before step 110, or step 110 may be executed before step 120. The order of executing the above two steps may be determined according to actual situations, which is not limited here.

According to the technical solution of this embodiment, based on key points of skeleton of at least one video frame in a video to be recognized, shallow features of the at least one video frame are determined; image features of the at least one video frame are acquired; action features of the at least one video frame are acquired based on the shallow features and the image features; an action recognition result of the at least one video frame is acquired by inputting the action features of the at least one video frame into an action recognition model, where the action recognition result includes states and state probabilities of actions in the at least one video frame; and an execution state of a target action in the at least one video frame is determined based on the action recognition result of the at least one video frame. Since the action features are fused with the shallow features and the image features, the action features can reflect certain semantic information while accurately reflecting human posture and movement information. The accuracy of the action recognition is improved by inputting the action features as input variables into the action recognition model. In addition, the execution state of the target action in each of the video frames is determined not only based on the action recognition result of the video frame but also with reference to action recognition results of other video frames, thereby improving the accuracy in action recognition.

Optionally, based on the above technical solutions, the action recognition model may be trained in the following manner A training sample is acquired and divided into a training set and a verification set, where the training sample includes two or more training video frames and real action states of each of the training video frames. Shallow features of the two or more training video frames are determined based on key points of skeleton in the two or more training video frames Image features of the two or more training video frames are acquired. Action features of the two or more training video frames are acquired based on the shallow features and the image features of the two or more training video frames. The action recognition model to be verified is acquired by training a classifier by taking the action features of the plurality of training video frames in the training set as input variables and by taking real action states of the plurality of training video frames in the training set as output variables. Predicated action states of the plurality of training video frames in the verification set are acquired by inputting the action features of the plurality of training video frames in the verification set into the action recognition model to be verified; and a confusion matrix is constructed based on the real action states and the predicted action states of the plurality of training video frames in the verification set. The real action states of the two or more training video frames are adjusted based on the confusion matrix, and the action recognition model to be verified is continuously trained until a recognition rate for each of the real action states in each of the training video frames in the confusion matrix, acquired based on the trained action recognition model to be verified, is greater than or equal to a recognition rate threshold. The trained action recognition model to be verified is taken as the action recognition model.

In the embodiment of the present disclosure, considering that the action recognition model may run on a mobile terminal, it is necessary to select a classifier model with a higher calculation speed. The classifier may include a random forest, a fully connected neural network, a convolutional neural network, a recurrent neural network and an improved recurrent neural network thereof, etc. Variants of the improved recurrent neural network may include long- and short-term memory networks, which may solve the problem of gradient explosion or vanishment in the recurrent neural network.

Considering that the action recognition model will run on the mobile terminal which has a limited hardware performance, based on the description above, first, the structure size of the classifier is restricted at an algorithm level, for example, a number of trees in the random forest, a number of hidden layers of the fully connected neural network, a number of neurons in each of the hidden layers, and the depth and width of the convolutional neural network are restricted; second, fixed-point calculations are employed at an instruction level. In addition, some operations have been adjusted at an assembly level.

The form of the classifier may be selected based on the hardware performance of the mobile terminal and the requirements of actual practices, and one or more forms of the classifier may be selected, which is not limited here.

The action recognition model may be trained in the following manner: acquiring a training sample, and dividing the training sample into a training set and a verification set, where the training sample includes two or more training video frames and real action states of each of the training video frames. The real action states of each of the video frames are pre-labeled based on that: the action recognition model may be configured to recognize N actions, and denote an $n^{th}$ action as $A_n$, $n \in \{0,1,2,\ldots, N-1\}$. Meanwhile, $A_n$ is split into a plurality of real action states, namely:

$$A_n = \{S_{n,0}', S_{n,1}', \ldots, S_{n,m}', \ldots, S_{n,P}'\},$$

where $S_{n,m}'$ represents an $m^{th}$ real action state $m \in \{0, 1, \ldots, P\}$ of the $n^{th}$ action. The above splitting of each of the actions into a plurality of real action states is customizable. Therefore, there may be a problem of confusion or overlap between the customized real action states, which may cause interferences to the training of the action recognition model to increase the difficulty in training. As a result, the recognition rate of the model is reduced. In order to solve the above problem, a method of constructing a confusion matrix is employed as follows.

Shallow features of the two or more training video frames are determined based on key points of skeleton in the two or more training video frames. Image features of the two or more training video frames are acquired; and action features of the two or more training video frames are acquired based on the shallow features and image features of the two or more training video frames. That is, each of the training video frames has corresponding action features, which are acquired based on the shallow features and image features of the training video frame. The training video frames mentioned here refer to those in the training samples, including the training video frames in the training set and the training video frames in the verification set.

The action recognition model to be verified is acquired by training a classifier by taking the action features of the plurality of training video frames in the training set as input variables and by taking real action states of the plurality of training video frames in the training set as output variables. Then, predicated action states of the plurality of training video frames in the verification set are acquired by inputting the action features of the plurality of training video frames in the verification set into the action recognition model to be verified; and a confusion matrix is constructed based on the real action states and the predicted action states of the plurality of training video frames in the verification set. The confusion matrix is a visual schematic diagram of a classification effect. It may serve to depict a relationship between a true attribution category and a predicted category of the sample data. Each row in the confusion matrix represents a real attribution category of a sample, and each column in the confusion matrix represent a predicted category of the sample. In the confusion matrix, diagonal elements represent a number of correct classifications, and off-diagonal elements represent a number of mis-classifications. With the confusion matrix, it can be intuitively seen where errors occur.

In the embodiment of the present disclosure, the true attribution category of the sample data refers to a real action state of each of the training video frames in the verification set; and the predicted category refers to a predicted action state of each of the training video frames in the verification set. Confusable real action states may be acquired based on the recognition rate of the confusion matrix. The real action state of each of the training video frames is adjusted based on a result from the confusion matrix. That is, the above-mentioned confusable real action states are combined or re-split, such that the real action states of plurality of training video frames are updated. Based on the updated real action states of two or more training video frames, the action recognition model to be verified is continuously trained, until a recognition rate for the real action state of each of the training video frames in the confusion matrix, acquired based on the trained action recognition model to be verified, is greater or equal to a recognition rate threshold. That is, the action recognition model to be verified is trained by taking the action features of a plurality of training video frames in the training set as input variables, and by taking the real action states of the plurality of updated training video frames in the training set as output variables. The predicted action states of the plurality of training video frames in the verification set are acquired by inputting the action features of the plurality of updated training video frames in the verification set into the action recognition model to be verified. A confusion matrix is constructed based on the real action states and the predicted action states of the plurality of updated training video frames in the verification set. The real action states of the updated two or more training video frames are adjusted based on the confusion matrix; and the action recognition model to be verified is continuously trained, until a recognition rate for the real action state of each of the training video frames in the confusion matrix, acquired based on the trained action recognition model to be verified, is greater or equal to a threshold of the recognition rate. Finally, the trained action recognition model to be verified may act as the action recognition model.

Splitting $A_n$ into a plurality of real action states as described before is as follows:

$$A_n = \{S_{n,0}', S_{n,1}', \ldots, S_{n,m}', \ldots, S_{n,P}'\},$$

where $S_{n,m}'$ represents an $m^{th}$ real action state $m \in \{0,1,\ldots,P\}$ of an $n^{th}$ action, which may change with the adjustment of each of the real action states during a training process.

In order to improve the robustness of the action recognition model, data enhancement may be considered to be performed on the training samples during the training process. Data enhancement methods may include scale transformation, flip transformation, translation transformation, scaling transformation, and RGB channel enhancement, etc. In an exemplary embodiment, for example, the key points of skeleton in the training video frames are horizontally flipped.

In a model training process, time stamps corresponding to the real action states in the training video frames will also be labeled.

The above construction of the confusion matrix allows the customized real action states to gradually conform to the actual situation, thereby improving the recognition accuracy of the action recognition model acquired by training.

Optionally, based on the technical solutions described above, the shallow features include static features, limb features, symmetric features, and dynamic features. The static features, the symmetric features and the dynamic features of each of the video frames may be calculated by the following formulas:

$$\phi_{static}^{(t)} = \left[ \frac{x_0^{(t)} - x^{(t)}}{l^{(t)}}, \frac{y_0^{(t)} - y^{(t)}}{l^{(t)}}, \ldots, \right.$$

$$\left. \frac{x_i^{(t)} - x^{(t)}}{l^{(t)}}, \frac{y_i^{(t)} - y^{(t)}}{l^{(t)}}, \ldots, \frac{x_{K-1}^{(t)} - x^{(t)}}{l^{(t)}}, \frac{y_{K-1}^{(t)} - y^{(t)}}{l^{(t)}} \right],$$

$$\phi_{symmetric}^{(t)} = \left[ \frac{x_2^{(t)} - x_3^{(t)}}{l^{(t)}}, \frac{y_2^{(t)} - y_3^{(t)}}{l^{(t)}}, \ldots, \frac{x_j^{(t)} - x_{j+1}^{(t)}}{l^{(t)}}, \right.$$

$$\left. \frac{y_j^{(t)} - y_{j+1}^{(t)}}{l^{(t)}}, \ldots, \frac{x_{K-2}^{(t)} - x_{K-1}^{(t)}}{l^{(t)}}, \frac{y_{K-2}^{(t)} - y_{K-1}^{(t)}}{l^{(t)}} \right], \text{ and}$$

$$\phi_{dynamic}^{(t)} = \left[ \phi_{static}^{(t)} - \phi_{static}^{(t-\tau)}, \phi_{static}^{(t)} - \phi_{static}^{(t-2\tau)} \right],$$

where $p^{(t)} = [x_0^{(t)}, y_0^{(t)}, \ldots, x_i^{(t)}, y_i^{(t)}, \ldots, x_{K-1}^{(t)}, y_{K-1}^{(t)}]$; $p^{(t)}$ represents a coordinate set of key points of skeleton in a $t^{th}$ video frame; K represents a number of key points of skeleton contained in the $t^{th}$ video frame; $(x_i^{(t)}, y_i^{(t)})$ represents coordinates of an $i^{th}$ key point of skeleton in a $t^{th}$ video frame; $i \in [0, 1, \ldots, K-1]$; $(x_j^{(t)}, y_j^{(t)})$ represents coordinates of a $j^{th}$ key point of skeleton in the $t^{th}$ video frame; $j \in [2, 4, \ldots, K-2]$; j is an even number; $(x^{(t)}, y^{(t)})$ represents a geometric center of a line connecting a left shoulder to a right shoulder in the $t^{th}$ video frame; $l^{(t)}$ represents an average value of a distance from a left shoulder to a right crotch and a distance from a right shoulder to a left crotch in the $t^{th}$ video frame; $\phi_{static}^{(t)}$ represents static features of the $t^{th}$ video frame; $\phi_{static}^{(t-\tau)}$ represents static features of a $t-\tau^{th}$ video frame; $\phi_{static}^{(t-2\tau)}$ represents static features of a $t-2\tau^{th}$ video frame; $2\tau$ is less than or equal to t; $\phi_{symmetric}^{(t)}$ represents symmetric features of the $t^{th}$ video frame; and $\phi_{dynamic}^{(t)}$ represents dynamic features of the $t^{th}$ video frame.

In the embodiment of the present disclosure, the shallow features of the at least one video frame are determined based on the key points of skeleton of the at least one video frame. The shallow features may include static features, limb features, symmetric features, and dynamic features. The key points of skeleton may be expressed in two-dimensional coordinates, and include the top of the head, chin, left shoulder, right shoulder, left elbow, right elbow, left wrist, right wrist, left crotch, right crotch, left knee, right knee, left ankle and right ankle. Each of the at least one video frame includes the key points of skeleton described above. A coordinate set $p^{(t)}$ of the key points of skeleton in the $t^{th}$ video frame may be expressed as:

$$p^{(t)} = [x_0^{(t)}, y_0^{(t)}, \ldots, x_i^{(t)}, y_i^{(t)}, \ldots, x_{K-1}^{(t)}, y_{K-1}^{(t)}],$$

where $(x_i^{(t)}, y_i^{(t)})$ represents coordinates of an $i^{th}$ key point of skeleton in the $t^{th}$ video frame; $i \in [0, 1, \ldots, K-1]$; and K represents a number of key points of skeleton included in the $t^{th}$ video frame.

The static feature $\phi_{static}^{(t)}$ of the $t^{th}$ video frame may be expressed as:

$$\phi_{static}^{(t)} = \left[ \frac{x_0^{(t)} - x^{(t)}}{l^{(t)}}, \frac{y_0^{(t)} - y^{(t)}}{l^{(t)}}, \ldots, \right.$$

$$\left. \frac{x_i^{(t)} - x^{(t)}}{l^{(t)}}, \frac{y_i^{(t)} - y^{(t)}}{l^{(t)}}, \ldots, \frac{x_{K-1}^{(t)} - x^{(t)}}{l^{(t)}}, \frac{y_{K-1}^{(t)} - y^{(t)}}{l^{(t)}} \right],$$

where $(x^{(t)}, y^{(t)})$ represents a geometric center of a line connecting the left shoulder to the right shoulder in the $t^{th}$ video frame, and $l^{(t)}$ represents an average value of a distance from the left shoulder to a right crotch and a distance from the right shoulder to a left crotch in the $t^{th}$ video frame. A reason for choosing the geometric center of the line connecting the (left shoulder to the right shoulder as $(x^{(t)}, y^{(t)})$ lies in that: the positioning of the left and right shoulders is relatively accurate, and the positions of the left and right shoulders are relatively stable across different actions. A reason for choosing the average value of the distance from the left shoulder to the right crotch and the distance from the right shoulder to the left crotch as $l^{(t)}$ lies in that: the change of the average value of the distance from the left shoulder to the right crotch and the distance from the right shoulder to the left crotch is relatively small across different actions.

The symmetric features $\phi_{symmetric}^{(t)}$ of the $t^{th}$ video frame may be expressed as:

$$\phi_{symmetric}^{(t)} = \left[ \frac{x_2^{(t)} - x_3^{(t)}}{l^{(t)}}, \frac{y_2^{(t)} - y_3^{(t)}}{l^{(t)}}, \ldots, \right.$$

$$\left. \frac{x_j^{(t)} - x_{j+1}^{(t)}}{l^{(t)}}, \frac{y_j^{(t)} - y_{j+1}^{(t)}}{l^{(t)}}, \ldots, \frac{x_{K-2}^{(t)} - x_{K-1}^{(t)}}{l^{(t)}}, \frac{y_{K-2}^{(t)} - y_{K-1}^{(t)}}{l^{(t)}} \right],$$

Reasons for acquiring the symmetric features of the video frame lie in that: first, the video is shot by a user facing a camera of a mobile terminal, and when the user is standing, his/her body per se is symmetrical; and second, some actions (such as raising the right hand or stamping the left foot) may cause the originally symmetric body to become asymmetric, and accordingly, the originally symmetric key points of skeleton may also become asymmetric. Based on the description above, if the above information is available, it is conducive to the improvement of the accuracy of the action recognition. In the embodiment of the present disclosure, $(x_j^{(t)}, y_j^{(t)})$ and $(x_{j+1}^{(t)}, y_{j+1}^{(t)})$ are symmetrical features in a set. With different values of j, the above symmetrical features may be: the left and right shoulders, the left and right elbows, the left and right wrists, the left and right crotches, the left and right knees, and the left and right ankles. In the embodiment of the present disclosure, $j \in [2,4,\ldots,K-2]$, which is related to which number is used to identify the key point of skeleton. In an exemplary embodiment, in the embodiment of the present disclosure, K=14, and the top of the head, the chin, the left shoulder, the right shoulder, the left elbow, the right elbow, the left wrist, the right wrist, the left crotch, the right crotch, the left knee, the right knee, the left ankle, and the right ankle are identified by using 0, 1, . . . , K−1 respectively.

The dynamic features $\phi_{dynamic}^{(t)}$ of the $t^{th}$ video frame may be expressed as: $\phi_{dynamic}^{(t)}=[\phi_{static}^{(t)}-\phi_{static}^{(t-\tau)}, \phi_{static}^{(t)}-\phi_{static}^{(t-2\tau)}]$, where $\phi_{static}^{(t)}$ represents static features of the $t$th video frame; $\phi_{static}^{(t-\tau)}$ represents static features of a $t-\tau^{th}$ video frame; $\phi_{static}^{(t-2\tau)}$ represents static features of a $t-2\tau^{th}$ video frame; and $\phi_{dynamic}^{(t)} \in R^{4K}$, with $R^{4K}$ representing a real number space having a dimension of 4K.

A reason for acquiring the dynamic features of the video frames lies in that: with the static features, a position of each of the key points of skeleton in a current video frame may be acquired, but a movement trajectory of the key point of skeleton may not be acquired; for some similar actions, they are similar in the positions of the key points of skeleton in a video frame, but movement directions and speeds in several video frames adjacent to the video frame are not the same; therefore, different actions may not be well recognized if only based on the static features. Based on the description above, for a video frame, it may be considered to combine the static features of several video frames adjacent to the video frame to form dynamic features for improving the accuracy of the action recognition.

In addition, considering the operating efficiency, a differential method is utilized to form the dynamic features from the static features of several adjacent video frames. The dynamic features of the video frame include movement directions and movement speeds of the key points of skeleton. Computations for acquiring the dynamic features of the video frame have less complexity and are easy to implement.

For the limb features, in different actions, changes of the key points of skeleton in the head and trunk are relatively small, while changes of the key points of skeleton in the limbs are relatively large. Therefore, position information of the key points of skeleton in the limbs are extracted to form the limb features.

The limb features may include: a normalized distance from the left shoulder to the left elbow, an included angle formed between a line connecting the left shoulder and the left elbow and a horizontal direction, a normalized distance from the left elbow to the left wrist, an included angle formed between a line connecting the left elbow and the left wrist and the horizontal direction, a normalized distance from the right shoulder to the right elbow, an included angle formed between a line connecting the right shoulder and the right elbow and a horizontal direction, a normalized distance from the right elbow to the right wrist, and an included angle formed between a line connecting the right elbow and the right wrist and the horizontal direction. For the $t^{th}$ video frame, the limb features thereof may be expressed as $\phi_{limbs}^{(t)}$, where $\phi_{limbs}^{(t)} \in R^8$, and $R^8$ represents a real number space having a dimension of 8.

Optionally, based on the technical solution described above, acquiring the image features of the at least one video frame may include: acquiring the image features of each of the at least one video frame by inputting the video frame into an image feature recognition model, where the image feature recognition model is generated by training based on a neural network.

In the embodiment of the present disclosure, the image features of each of the at least one video frame may be acquired by inputting the video frame into the image feature recognition model, where the image feature recognition model may be generated by training based on neural network, and the neural network may include a convolutional neural network.

Optionally, based on the technical solution described above, in the case that at least one video frame refers to a plurality of video frames, acquiring the image feature of the at least one video frame may include: dividing the plurality of video frames into at least two video frames sequences. Image features of a first video frame in each of the at least two video frame sequences are acquired by inputting the first video frame in each of the at least two video frame sequences into the image feature recognition model; and the image features of the first video frame in each of the at least two video frame sequences are taken as the image features of each of the video frames in each of the at least two video frame sequences.

In the embodiment of the present disclosure, although the image features have the advantages described above, frequently acquiring the image features will increase time overhead. In order to reduce the time overhead in acquiring the image features, a frame skipping and multiplexing method is employed to acquire the image features of the video frames as follows.

A plurality of video frames in a video are divided into at least two video frame sequences in a time sequence, where at least two video frame sequences do not overlap, and a number of video frames included in each of the at least two video frame sequences may be the same or different, which can be determined based on the actual situation, and is not limited here. Meanwhile, each of the at least two video frame sequences may include a first video frame, a second video frame, . . . , a $P^{th}$ video frame in a time sequence. Image features of the first video frame in each of the at least two video frame sequences are taken as the image features of each of the at least two video frames in the video frame sequence. That is, for each of the at least two video frame sequences, the image features of the first video frame in the video frame sequence are acquired by inputting the first video frame in the video frame sequence into the image feature recognition model; and the image features of the first video frame in the video frame sequence are taken as image features of each of the video frame in the video frame sequence.

Compared with the acquisition of the image features of each of the video frames by inputting the video frame into the image feature recognition model, the above-mentioned frame skipping and multiplexing method for acquiring the image features of each of the video frames may reduce the time overhead in acquiring the image features.

In the technical solution according to the embodiment of the present disclosure, the method for recognizing the key points of skeleton based on the convolutional neural network is improved at the algorithm and instruction levels, and the image feature recognition model generated by training based on the neural network is improved at the algorithm and instruction levels, such that the technical solution according to the embodiment of the present disclosure may run on a mobile terminal in real time.

Figure 2:
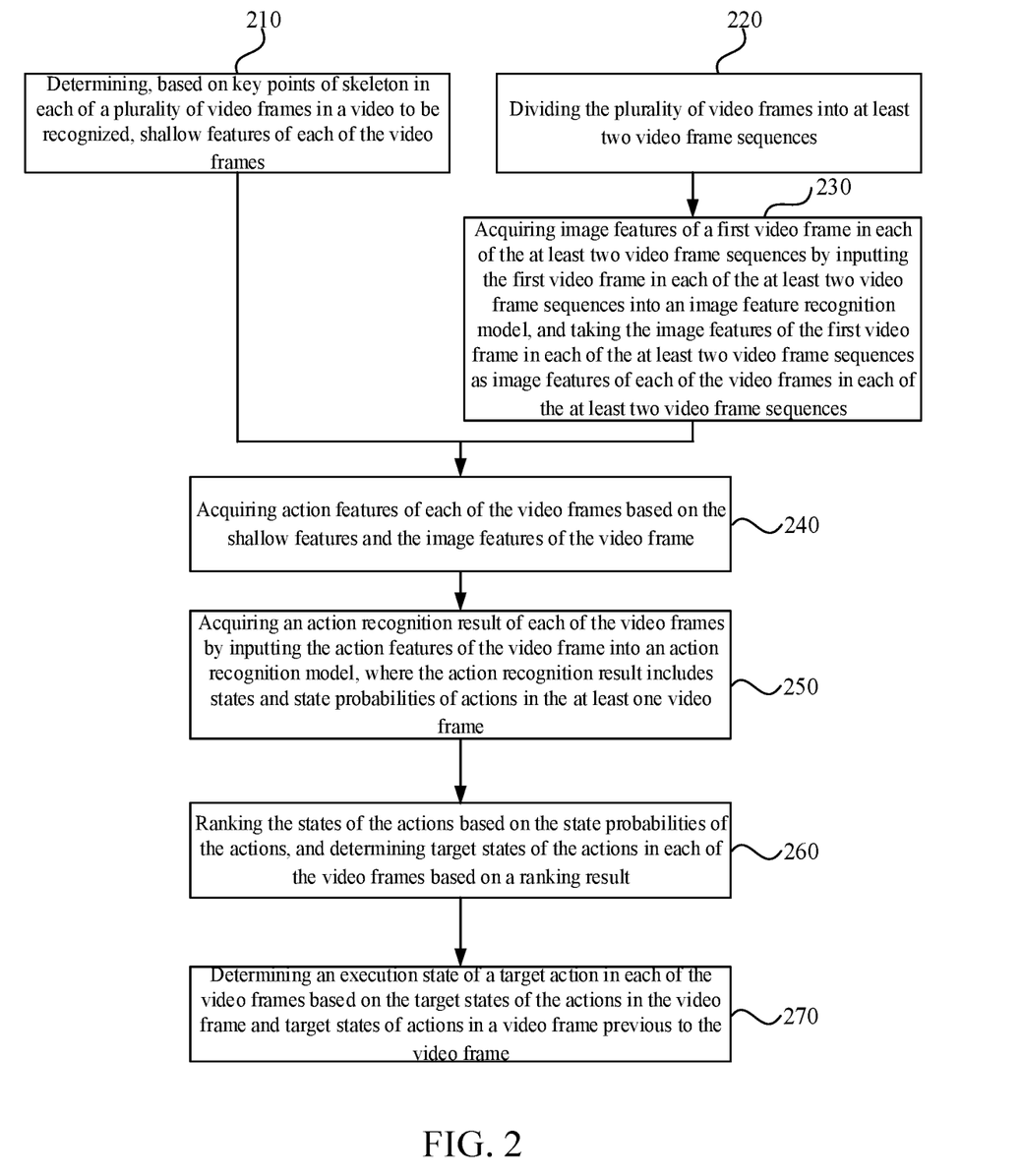
FIG. 2 is a flowchart of a method for recognizing actions according to another embodiment of the present disclosure.

FIG. 2 is a flowchart of a method for recognizing actions according to another embodiment of the present disclosure. This embodiment is applicable to the case of recognizing the actions in a video. The method may be executed by an apparatus for recognizing actions. The apparatus may be implemented in a form of software and/or hardware, and may be configured in a device, for example, a computer or a mobile terminal, etc. As shown in FIG. 2, the method includes the following steps.

In step 210, shallow features of each of a plurality of video frames in a video to be recognized are determined based on key points of skeleton in the video frame.

In step 220, the plurality of video frames are divided into at least two video frame sequences.

In step 230, image features of a first video frame in each of the at least two video frame sequences are acquired by inputting the first video frame in each of the at least two video frame sequences into an image feature recognition model; and the image features of the first video frame in each of the at least two video frame sequences are taken as image features of each of the video frame in each of the at least two video frame sequences.

In step 240, action features of each of the video frames are acquired based on the shallow features and the image features of the video frame.

In step 250, an action recognition result of each of the video frames is acquired by inputting the action features of the video frame into an action recognition model, where the action recognition result includes states and state probabilities of actions in the at least one video frame.

In step 260, states of the actions are ranked based on state probabilities of the actions, and target states of the actions in each of the video frames are determined based on a ranking result.

In step 270, an execution state of a target action in each of the video frames is determined based on the target states of the actions in the video frame and target states of actions in T video frames previous to the video frame.

In the embodiment of the present disclosure, determining the execution state of the target action in each of the at least one video frame based on the target states of the actions in the video frame and the target states of the actions in T video frames previous to the video frame may include: determining that the target action in each of the at least one video frame is being executed in the case that the target states of the actions in the video frame are start states of the target action; determining that the target action in each of the at least one video frame is being executed in the case that the target states of the actions in the video frame are intermediate states of the target action and the target states of the actions in the T video frames previous to the video frame include the start states of the target action; and determining that the target action in each of the at least one video frame is ended in the case that the target states of the actions in the video frame are end states of the target action and the target states of the actions in the T video frames previous to the video frame include the start states and the intermediate states of the target action.

The technical solution of this embodiment includes the following steps shallow features of each of a plurality of video frames in a video to be recognized are determined based on key points of skeleton in the video frame; image features of each of the video frames are acquired; action features of each of the video frames are acquired based on the shallow features and the image features of the video frame; an action recognition result of each of the video frames is acquired by inputting the action features of the video frame into an action recognition model, where the action recognition result includes states and state probabilities of actions in the at least one video frame; and an execution state of a target action in each of the video frames is determined based on the action recognition result of each of the video frames. Since the action features are fused with the shallow features and the image features, the action features may reflect certain semantic information while accurately reflecting human posture and movement information. The accuracy of the action recognition is improved by inputting the action features as input variables into the action recognition model. In addition, the execution state of the target action in each of the video frames is determined not only based on the action recognition result of the video frame but also with reference to action recognition results of other video frames, thereby improving the accuracy in action recognition.

Figure 3:
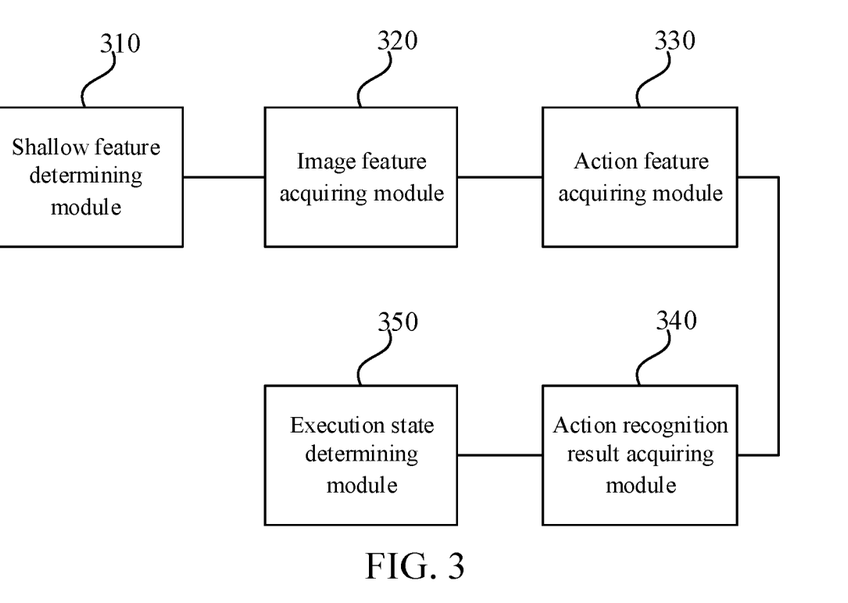
FIG. 3 is a schematic structural diagram of an apparatus for recognizing actions according to an embodiment of the present disclosure.

FIG. 3 is a flowchart of an apparatus for recognizing actions according to an embodiment of the present disclosure. This embodiment is applicable to the case of recognizing the actions in a video. The apparatus may be implemented in a form of software and/or hardware, and may be configured in a device, for example, typically a computer or a mobile terminal, etc. As shown in FIG. 3, the apparatus may include the following modules.

A shallow feature determining module 310 is configured to determine, based on key points of skeleton of at least one video frame in a video to be recognized, shallow features of the at least one video frame.

An image feature acquiring module 320 is configured to acquire image features in the at least one video frame.

An action feature acquiring module 330 is configured to acquire action features of the at least one video frame based on the shallow features and the image features.

An action recognition result acquiring module 340 is configured to acquire an action recognition result of the at least one video frame by inputting the action features of the at least one video frame into an action recognition model, where the action recognition result includes states and state probabilities of actions in the at least one video frame.

An execution state determining module 350 is configured to determine an execution state of a target action in the at least one video frame based on the action recognition result of the at least one video frame.

According to the technical solution of this embodiment, based on key points of skeleton of at least one video frame in a video to be recognized, shallow features of the at least one video frame are determined; image features of the at least one video frame are acquired; action features of the at least one video frame are acquired based on the shallow features and the image features; an action recognition result of the at least one video frame is acquired by inputting the action features of the at least one video frame into an action recognition model, where the action recognition result includes states and state probabilities of actions in the at least one video frame; and an execution state of a target action in the at least one video frame is determined based on the action recognition result of the at least one video frame. Since the action features are fused with the shallow features and the image features, the action features may reflect certain semantic information while accurately reflecting human posture and movement information. The accuracy of the action recognition is improved by inputting the action features as input variables into the action recognition model. In addition, the execution state of the target action in each of the video frames is determined not only based on the action recognition result of the video frame but also with reference to action recognition results of other video frames, thereby improving the accuracy in action recognition.

Figure 4:
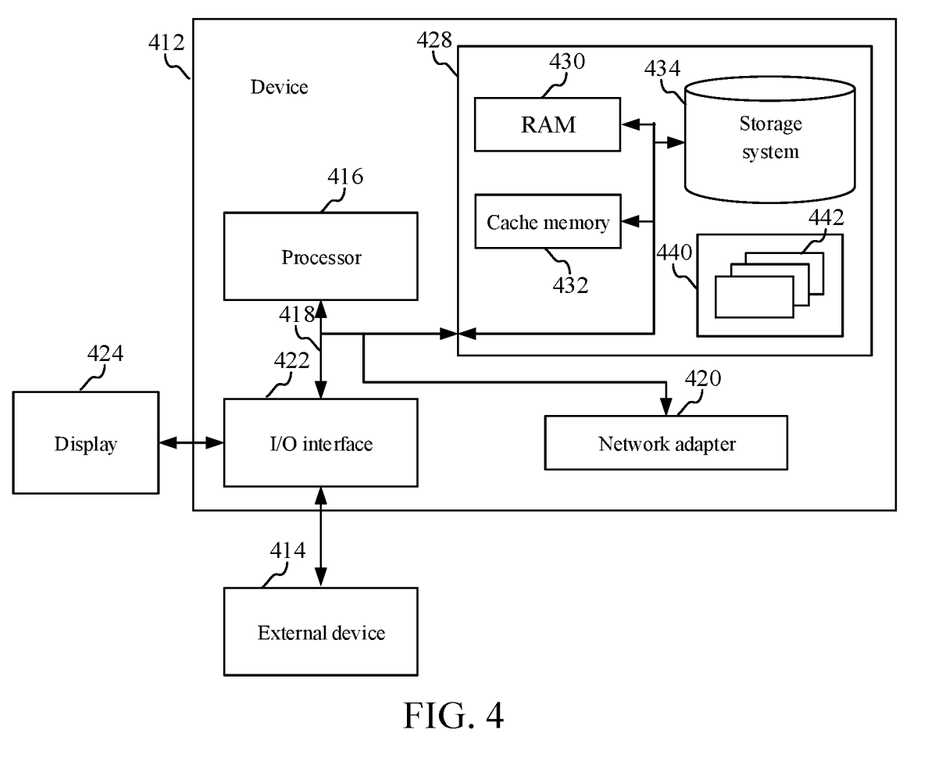
FIG. 4 is a schematic structural diagram of a device according to an embodiment of the present disclosure.

FIG. 4 is a schematic structural diagram of a device according to an embodiment of the present disclosure. FIG.

4 exemplarily shows a block diagram of a device 412 suitable for implementing the embodiments of the present disclosure.

As shown in FIG. 4, the device 412 is in the form of a general-purpose computing device. The device 412 may include, but not limited to, the following components: one or more processors 416, a system memory 428, and a bus 518 connected to different system components (including the system memory 428 and the processor 416). The system memory 428 may include a computer-system-readable medium in the form of a volatile memory, such as a random-access memory (RAM) 430 and/or a cache memory 432. By way of example only, a storage system 434 may be configured to read and write non-removable non-volatile magnetic media (not shown in FIG. 4, usually referred to as a "hard drive"). A program/utility tool 440 having a set of (at least one) program module 442 may be stored in, for example, the memory 428. The device 412 may also communicate with one or more external devices 414 (for example, a keyboard, a pointing device, a display 424, etc.). Such communications may be performed via an input/output (I/O) interface 422. Moreover, the device 412 may also communicate with one or more networks (for example, a local area network (LAN), a wide area network (WAN), and/or a public network, such as the Internet) via a network adapter 420. The processor 416 executes a plurality of functional applications and data processing by running at least one program stored in the system memory 428, for example, to implement the method for recognizing the actions according to the embodiment of the present disclosure. The method includes the following steps: determining, based on key points of skeleton of at least one video frame in a video to be recognized, shallow features of the at least one video frame; acquiring image features of the at least one video frame; acquiring action features of the at least one video frame based on the shallow features and the image features; acquiring an action recognition result of the at least one video frame by inputting the action features of the at least one video frame into an action recognition model, wherein the action recognition result includes states and state probabilities of actions in the at least one video frame; and determining an execution state of a target action in the at least one video frame based on the action recognition result of the at least one video frame.

The embodiments of the present disclosure further provide a computer-readable storage medium storing therein at least one computer program. The at least one program, when run by a processor, causes the processor to perform the method for recognizing the actions according to the embodiments of the present disclosure. The method includes the following steps: determining, based on key points of skeleton of at least one video frame in a video to be recognized, shallow features of the at least one video frame; acquiring image features of the at least one video frame; acquiring action features of the at least one video frame based on the shallow features and the image features; acquiring an action recognition result of the at least one video frame by inputting the action features of the at least one video frame into an action recognition model, wherein the action recognition result includes states and state probabilities of actions in the at least one video frame; and determining an execution state of a target action in the at least one video frame based on the action recognition result of the at least one video frame.

What is claimed is:

1. A method for recognizing actions in a video, the method comprising:
determining, based on key points of skeleton of at least one video frame in the video to be recognized, shallow features of the at least one video frame, wherein the shallow features reflect posture and movement information of a human body, and comprise static features, limb features, symmetric features, and dynamic features, wherein the static features comprise position information of each of the key points of skeleton, the dynamic features comprise movement directions and movement speeds of the key points of skeleton, limb features comprise position information of the key points of skeleton in limbs, and the symmetric features comprise position information of symmetric key points of skeleton;
acquiring image features of each of the at least one video frame by inputting the video frame into an image feature recognition model, wherein the image feature recognition model is generated by training based on a neural network, and the image features provide semantic information
acquiring action features of the at least one video frame based on the shallow features and the image features;
acquiring an action recognition result of the at least one video frame by inputting the action features of the at least one video frame into an action recognition model, wherein the action recognition result comprises states and state probabilities of actions in the at least one video frame; and
determining an execution state of a target action in the at least one video frame based on the action recognition result of the at least one video frame, wherein the target action is the action being executed, the execution state indicates which action and which state of the action is being executed by a target object in the video frame, and each action comprises at least one state.

2. The method according to claim 1, wherein determining the execution state of the target action in the at least one video frame based on the action recognition result of the at least one video frame comprises:
ranking, based on the state probabilities of a plurality of actions in the action recognition result of each of the at least one video frame, the states of the plurality of actions corresponding to the state probabilities of the plurality of actions, and determining target states of the actions in the video frame based on a ranking result; and
determining the execution state of the target action in each of the at least one video frame based on the target states of the actions in the video frame.

3. The method according to claim 2, wherein determining the execution state of the target action in each of the at least one video frame based on the target states of the actions in the video frame comprises:
determining the execution state of the target action in each of the at least one video frame based on the target states of the actions in the video frame and target states of actions in T video frames previous to the video frame.

4. The method according to claim 3, wherein determining the execution state of the target action in each of the at least one video frame based on the target states of the actions in the video frame and the target states of the actions in the T video frames previous to the video frame, comprises:
determining that the target action in each of the at least one video frame is being executed in the case that the target states of the actions in the video frame are start states of the target action;

determining that the target action in each of the at least one video frame is being executed in the case that the target states of the actions in the video frame are intermediate states of the target action and the target states of the actions in the T video frames previous to the video frame comprise the start states of the target action; and determining that the target action in each of the at least one video frame is ended in the case that the target states of the actions in the video frame are end states of the target action and the target states of the actions in the T video frames previous to the video frame comprise the start states and the intermediate states of the target action.

5. The method according to claim 1, wherein the action recognition model is trained by:

acquiring a training sample, and dividing the training sample into a training set and a verification set, wherein the training sample comprises two or more training video frames and real action states of each of the training video frames;

determining, based on key points of skeleton in the two or more training video frames, shallow features of the two or more training video frames;

acquiring image features of the two or more training video frames;

acquiring action features of the two or more training video frames based on the shallow features and image features of the two or more training video frames;

acquiring the action recognition model by training a classifier based on the action features and the real action states of the training video frames in the training set;

acquiring predicated action states of the training video frames in the verification set by inputting the action features of the training video frames in the verification set into the action recognition model, and constructing a confusion matrix based on the real action states and the predicted action states of the training video frames in the verification set; and adjusting the real action states of the two or more training video frames based on the confusion matrix, and iteratively training the action recognition model until a recognition rate for each of the real action states in the confusion matrix, acquired based on the trained action recognition model, is greater than or equal to a recognition rate threshold.

6. The method according to claim 1, wherein the shallow features comprise static features, limb features, symmetric features, and dynamic features;

wherein the static features, the symmetric features and the dynamic features of each of the at least one video frame are calculated by the following formulas:

$$\phi_{static}^{(t)} = \left[ \frac{x_0^{(t)} - x^{(t)}}{l^{(t)}}, \frac{y_0^{(t)} - y^{(t)}}{l^{(t)}}, \ldots, \frac{x_i^{(t)} - x^{(t)}}{l^{(t)}}, \frac{y_i^{(t)} - y^{(t)}}{l^{(t)}}, \ldots, \frac{x_{K-1}^{(t)} - x^{(t)}}{l^{(t)}}, \frac{y_{K-1}^{(t)} - y^{(t)}}{l^{(t)}} \right]$$

$$\phi_{symmetric}^{(t)} = \left[ \frac{x_2^{(t)} - x_3^{(t)}}{l^{(t)}}, \frac{y_2^{(t)} - y_3^{(t)}}{l^{(t)}}, \ldots, \frac{x_j^{(t)} - x_{j+1}^{(t)}}{l^{(t)}}, \frac{y_j^{(t)} - y_{j+1}^{(t)}}{l^{(t)}}, \ldots, \frac{x_{K-2}^{(t)} - x_{K-1}^{(t)}}{l^{(t)}}, \frac{y_{K-2}^{(t)} - y_{K-1}^{(t)}}{l^{(t)}} \right], \text{ and}$$

$$\phi_{dynamic}^{(t)} = \left[ \phi_{static}^{(t)} - \phi_{static}^{(t-\tau)}, \phi_{static}^{(t)} - \phi_{static}^{(t-2\tau)} \right],$$

wherein $p^{(t)} = [x_0^{(t)}, y_0^{(t)}, \ldots, x_i^{(t)}, y_i^{(t)}, \ldots, x_{K-1}^{(t)}, y_{K-1}^{(t)}]$; $p^{(t)}$ represents a coordinate set of key points of skeleton in a $t^{th}$ video frame; K represents a number of key points of skeleton in the $t^{th}$ video frame; $(x_i^{(t)}, y_i^{(t)})$ represents coordinates of an $i^{th}$ key point of skeleton in the $t^{th}$ video frame; $i \in [0, 1, \ldots, K-1]$; $(x_j^{(t)}, y_j^{(t)})$ represents coordinates of a $j^{th}$ key point of skeleton in the $t^{th}$ video frame; $j \in [2, 4, \ldots, K-2]$; j is an even number; $(x^{(t)}, y^{(t)})$ represents a geometric center of a line connecting a left shoulder to a right shoulder in the $t^{th}$ video frame; $l^{(t)}$ represents an average value of a distance from a left shoulder to a right crotch and a distance from a right shoulder to a left crotch in the $t^{th}$ video frame; $\phi_{static}^{(t)}$ represents static features of the $t^{th}$ video frame; $\phi_{static}^{(t-\tau)}$ represents static features of a $t-\tau^{th}$ video frame; $\phi_{static}^{(t-2\tau)}$ represents static features of a $t-\tau^{th}$ video frame; $\phi_{static}^{(t-2\tau)}$ represents static features of a $t-2\tau^{th}$ video frame; $2\tau$ is less than or equal to t; $\phi_{symmetric}^{(t)}$ represents symmetric features of the $t^{th}$ video frame; and $\phi_{dynamic}^{(t)}$ represents dynamic features of the $t^{th}$ video frame.

7. The method according to claim 1, wherein in the case that the video to be recognized comprises a plurality of video frames, acquiring the image features of the at least one video frame comprises:

dividing the plurality of video frames into at least two video frame sequences; and acquiring image features of a first video frame in each of the at least two video frame sequences by inputting the first video frame in each of the at least two video frame sequences into an image feature recognition model, and taking the image features of the first video frame in each of the at least two video frame sequences as image features of each of the video frames in each of the at least two video frame sequences, wherein the image feature recognition model is generated by training based on a neural network.

8. The method according to claim 1, wherein the limb features comprising a normalized distance from a left shoulder to a left elbow, an included angle formed between a line connecting the left shoulder and the left elbow and a horizontal direction, a normalized distance from the left elbow to a left wrist, an included angle formed between a line connecting the left elbow and the left wrist and the horizontal direction, a normalized distance from a right shoulder to a right elbow, an included angle formed between a line connecting the right shoulder and the right elbow and a horizontal direction, a normalized distance from the right elbow to a right wrist, and an included angle formed between a line connecting the right elbow and the right wrist and the horizontal direction.

9. The method according to claim 1, further comprising:

sending the execution state of the target action to an upper-layer application in real time, to cause the upper-layer application to set different operations based on the execution state of the target action, wherein the different operations comprise adding different video effects.

10. A device, comprising:
one or more processors;
a memory configured to store one or more programs;
wherein the one or more programs, when executed by the one or more processors, cause the one or more processors to perform a method for recognizing actions comprising:
determining, based on key points of skeleton of at least one video frame in a video to be recognized, shallow features of the at least one video frame, wherein the shallow features reflect posture and movement information of a human body, the shallow features comprise static features, limb features, symmetric features, and dynamic features, the static features comprise position information of each of the key points of skeleton, the dynamic features comprise movement directions and movement speeds of the key points of skeleton, limb features comprise position information of the key points of skeleton in limbs, and the symmetric features comprise position information of symmetric key points of skeleton;
acquiring image features of each of the at least one video frame by inputting the video frame into an image feature recognition model, wherein the image feature recognition model is generated by training based on a neural network, and the image features provide semantic information;
acquiring action features of the at least one video frame based on the shallow features and the image features;
acquiring an action recognition result of the at least one video frame by inputting the action features of the at least one video frame into an action recognition model, wherein the action recognition result comprises states and state probabilities of actions in the at least one video frame; and
determining an execution state of a target action in the at least one video frame based on the action recognition result of the at least one video frame, wherein the target action is the action being executed, the execution state indicates which action and which state of the action is being executed, and each action comprises at least one state.

11. The device according to claim 10, wherein determining the execution state of the target action in the at least one video frame based on the action recognition result of the at least one video frame comprises:
ranking, based on the state probabilities of a plurality of actions in the action recognition result of each of the at least one video frame, the states of the plurality of actions corresponding to the state probabilities of the plurality of actions, and determining target states of the actions in the video frame based on a ranking result; and
determining the execution state of the target action in each of the at least one video frame based on the target states of the actions in the video frame.

12. The device according to claim 11, wherein determining the execution state of the target action in each of the at least one video frame based on the target states of the actions in the video frame comprises:
determining the execution state of the target action in each of the at least one video frame based on the target states of the actions in the video frame and target states of actions in T video frames previous to the video frame.

13. The device according to claim 12, wherein determining the execution state of the target action in each of the at least one video frame based on the target states of the actions in the video frame and the target states of the actions in the T video frames previous to the video frame, comprises:
determining that the target action in each of the at least one video frame is being executed in the case that the target states of the actions in the video frame are start states of the target action;
determining that the target action in each of the at least one video frame is being executed in the case that the target states of the actions in the video frame are intermediate states of the target action and the target states of the actions in the T video frames previous to the video frame comprise the start states of the target action; and
determining that the target action in each of the at least one video frame is ended in the case that the target states of the actions in the video frame are end states of the target action and the target states of the actions in the T video frames previous to the video frame comprise the start states and the intermediate states of the target action.

14. The device according to claim 10, wherein the action recognition model is trained by:
acquiring a training sample, and dividing the training sample into a training set and a verification set, wherein the training sample comprises two or more training video frames and real action states of each of the training video frames;
determining, based on key points of skeleton in the two or more training video frames, shallow features of the two or more training video frames;
acquiring image features of the two or more training video frames;
acquiring action features of the two or more training video frames based on the shallow features and image features of the two or more training video frames;
acquiring the action recognition model by training a classifier based on the action features and the real action states of the training video frames in the training set;
acquiring predicated action states of the training video frames in the verification set by inputting the action features of the training video frames in the verification set into the action recognition model, and constructing a confusion matrix based on the real action states and the predicted action states of the training video frames in the verification set; and
adjusting the real action states of the two or more training video frames based on the confusion matrix, and iteratively training the action recognition model until a recognition rate for each of the real action states in the confusion matrix, acquired based on the trained action recognition model, is greater than or equal to a recognition rate threshold.

15. The device according to claim 10, wherein the shallow features comprise static features, limb features, symmetric features, and dynamic features;
wherein the static features, the symmetric features and the dynamic features of each of the at least one video frame are calculated by the following formulas:

$$\phi_{static}^{(t)} = \left[ \frac{x_0^{(t)} - x^{(t)}}{l^{(t)}}, \frac{y_0^{(t)} - y^{(t)}}{l^{(t)}}, \ldots, \right.$$

-continued $$\phi_{symmetric}^{(t)} = \left[\frac{x_i^{(t)} - x^{(t)}}{l^{(t)}}, \frac{y_i^{(t)} - y^{(t)}}{l^{(t)}}, \ldots, \frac{x_{K-1}^{(t)} - x^{(t)}}{l^{(t)}}, \frac{y_{K-1}^{(t)} - y^{(t)}}{l^{(t)}}\right],$$

$$\phi_{symmetric}^{(t)} = \left[\frac{x_2^{(t)} - x_3^{(t)}}{l^{(t)}}, \frac{y_2^{(t)} - y_3^{(t)}}{l^{(t)}}, \ldots, \frac{x_j^{(t)} - x_{j+1}^{(t)}}{l^{(t)}},\right.$$

$$\left.\frac{y_j^{(t)} - y_{j+1}^{(t)}}{l^{(t)}}, \ldots, \frac{x_{K-2}^{(t)} - x_{K-1}^{(t)}}{l^{(t)}}, \frac{y_{K-2}^{(t)} - y_{K-1}^{(t)}}{l^{(t)}}\right], \text{ and}$$

$$\phi_{dynamic}^{(t)} = \left[\phi_{static}^{(t)} - \phi_{static}^{(t-\tau)}, \phi_{static}^{(t)} - \phi_{static}^{(t-2\tau)}\right],$$

wherein $p^{(t)} = [x_0^{(t)}, y_0^{(t)}, \ldots, x_i^{(t)}, y_i^{(t)}, \ldots, x_{K-1}^{(t)}, y_{K-1}^{(t)}]$; $p^{(t)}$ represents a coordinate set of key points of skeleton in a $t^{th}$ video frame; K represents a number of key points of skeleton in the $t^{th}$ video frame; $(x_i^{(t)}, y_i^{(t)})$ represents coordinates of an $i^{th}$ key point of skeleton in the $t^{th}$ video frame; $i \in [0, 1, \ldots, k-1]$; $(x_j^{(t)}, y_j^{(t)})$ represents coordinates of a $j^{th}$ key point of skeleton in the $t^{th}$ video frame; $j \in [2, 4, \ldots, K-2]$; j is an even number; $(x^{(t)}, y^{(t)})$ represents a geometric center of a line connecting a left shoulder to a right shoulder in the $t^{th}$ video frame; $l^{(t)}$ represents an average value of a distance from a left shoulder to a right crotch and a distance from a right shoulder to a left crotch in the $t^{th}$ video frame; $\phi_{static}^{(t)}$ represents static features of the $t^{th}$ video frame; $\phi_{static}^{(t-\tau)}$ represents static features of a $t-\tau^{th}$ video frame; $\phi_{static}^{(t-2\tau)}$ represents static features of a $t-2\tau^{th}$ video frame; $2\tau$ is less than or equal to t; $\phi_{symmetric}^{(t)}$ represents symmetric features of the $t^{th}$ video frame; and $\phi_{dynamic}^{(t)}$ represents dynamic features of the $t^{th}$ video frame.

16. The device according to claim 10, wherein in the case that the video to be recognized comprises a plurality of video frames, acquiring the image features of the at least one video frame comprises:
dividing the plurality of video frames into at least two video frame sequences; and
acquiring image features of a first video frame in each of the at least two video frame sequences by inputting the first video frame in each of the at least two video frame sequences into an image feature recognition model, and taking the image features of the first video frame in each of the at least two video frame sequences as image features of each of the video frames in each of the at least two video frame sequences, wherein the image feature recognition model is generated by training based on a neural network.

17. A non-volatile computer-readable storage medium storing at least one computer program, wherein the at least one computer program, when run by a processor, causes the processor to perform a method for recognizing actions comprising:
determining, based on key points of skeleton of at least one video frame in a video to be recognized, shallow features of the at least one video frame, wherein the shallow features reflect posture and movement information of a human body, the shallow features comprise static features, limb features, symmetric features, and dynamic features, the static features comprise position information of each of the key points of skeleton, the dynamic features comprise movement directions and movement speeds of the key points of skeleton, limb features comprise position information of the key points of skeleton in limbs, and the symmetric features comprise position information of symmetric key points of skeleton;
acquiring image features of each of the at least one video frame by inputting the video frame into an image feature recognition model, wherein the image feature recognition model is generated by training based on a neural network, and the image features provide semantic information;
acquiring action features of the at least one video frame based on the shallow features and the image features;
acquiring an action recognition result of the at least one video frame by inputting the action features of the at least one video frame into an action recognition model, wherein the action recognition result comprises states and state probabilities of actions in the at least one video frame; and
determining an execution state of a target action in the at least one video frame based on the action recognition result of the at least one video frame, wherein the target action is the action being executed, the execution state indicates which action and which state of the action is being executed, and each action comprises at least one state.

18. The storage medium according to claim 17, wherein determining the execution state of the target action in the at least one video frame based on the action recognition result of the at least one video frame comprises:
ranking, based on the state probabilities of a plurality of actions in the action recognition result of each of the at least one video frame, the states of the plurality of actions corresponding to the state probabilities of the plurality of actions, and determining target states of the actions in the video frame based on a ranking result; and
determining the execution state of the target action in each of the at least one video frame based on the target states of the actions in the video frame.

19. The storage medium according to claim 17, wherein the action recognition model is trained by: acquiring a training sample, and dividing the training sample into a training set and a verification set, wherein the training sample comprises two or more training video frames and real action states of each of the training video frames;
determining, based on key points of skeleton in the two or more training video frames, shallow features of the two or more training video frames;
acquiring image features of the two or more training video frames;
acquiring action features of the two or more training video frames based on the shallow features and image features of the two or more training video frames;
acquiring the action recognition model by training a classifier based on the action features and the real action states of the training video frames in the training set;
acquiring predicated action states of the training video frames in the verification set by inputting the action features of the training video frames in the verification set into the action recognition model, and constructing a confusion matrix based on the real action states and the predicted action states of the training video frames in the verification set; and
adjusting the real action states of the two or more training video frames based on the confusion matrix, and iteratively training the action recognition model until a recognition rate for each of the real action states in the confusion matrix, acquired based on the trained action recognition model, is greater than or equal to a recognition rate threshold.

20. The storage medium according to claim 17, wherein in the case that the video to be recognized comprises a plurality of video frames, acquiring the image features of the at least one video frame comprises:

dividing the plurality of video frames into at least two video frame sequences; and acquiring image features of a first video frame in each of the at least two video frame sequences by inputting the first video frame in each of the at least two video frame sequences into an image feature recognition model, and taking the image features of the first video frame in each of the at least two video frame sequences as image features of each of the video frames in each of the at least two video frame sequences, wherein the image feature recognition model is generated by training based on a neural network.

\* \* \* \* \*